April 6, 1937.　　　　E. O. SCHJOLIN　　　　2,076,046
ENGINE MOUNTING
Filed Feb. 24, 1936　　　2 Sheets-Sheet 1
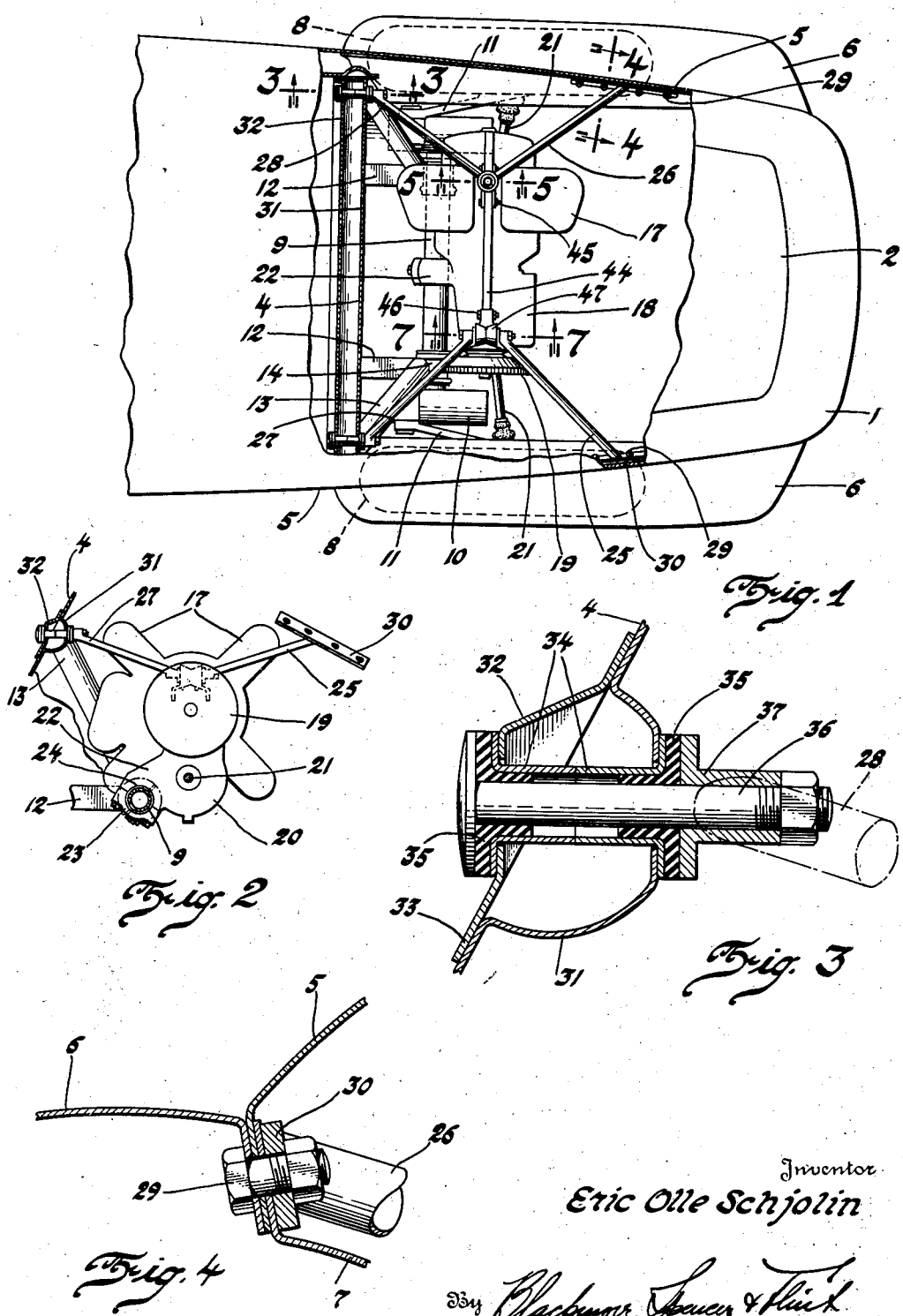
Inventor
Eric Olle Schjolin April 6, 1937.  E. O. SCHJOLIN  2,076,046
ENGINE MOUNTING
Filed Feb. 24, 1936  2 Sheets-Sheet 2

Inventor
Eric Olle Schjolin
By Blackmore, Spencer & Flink
Attorneys

Patented Apr. 6, 1937

2,076,046

UNITED STATES PATENT OFFICE 2,076,046

ENGINE MOUNTING

Eric Olle Schjolin, Pontiac, Mich., assignor to General Motors Corporation, Detroit, Mich., a corporation of Delaware Application February 24, 1936, Serial No. 65,219

5 Claims. (Cl. 180—54)

This invention relates to motor vehicles. Its object is to provide, as a subassembly, a compact and complete drive unit, including engine and road wheels, which is detachably joined to the vehicle proper. The novelty lies in the particular arrangement of the parts which comprise the vehicle propelling mechanism and their relation and attachment to the rest of the vehicle.

According to a preferred embodiment, the drive unit is located at the rear and is detachably connected to the vehicle for supporting the same upon resiliently mounted road wheels. This enables the whole unit to be removed or replaced easily for more convenient accessibility when major repairs thereon are necessary. As a backbone, the unit assembly has a transverse tube, or what for convenience may be termed a dead axle, on opposite ends of which the road wheels are independently sprung and which supports the power plant having universally joined drive shaft connection with the wheels, with provision for mounting the vehicle body frame at transversely spaced points adjacent the wheel mountings. In addition to its support upon the dead axle the power plant is braced from the body structure by a series of diagonal struts and an important feature in this connection is the use in the main support and supplemental bracing of connections specially designed to insulate and reduce the transmission of engine vibration to the body.

Figure 5:
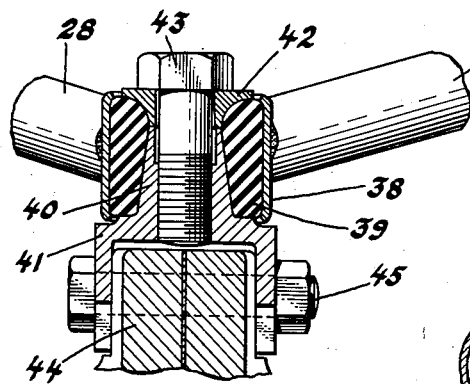
Figure 6:
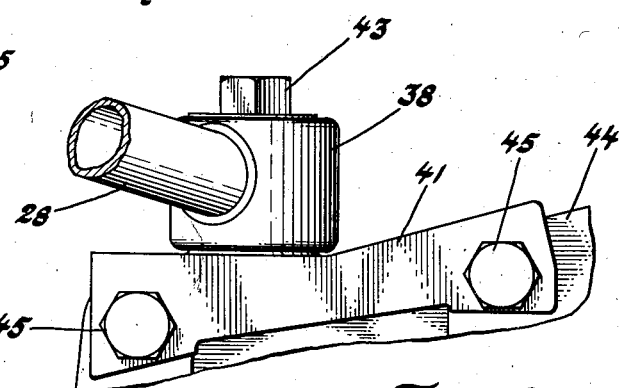
Figure 10:
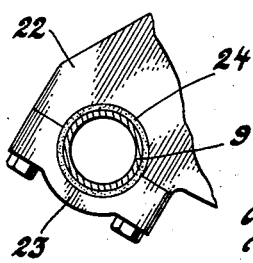
Figure 7:
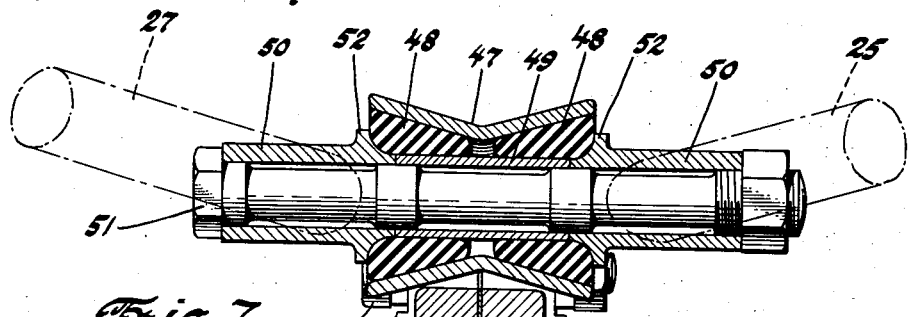
Figure 9:
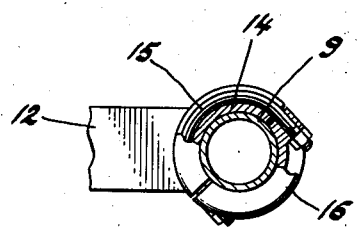
Figure 8:
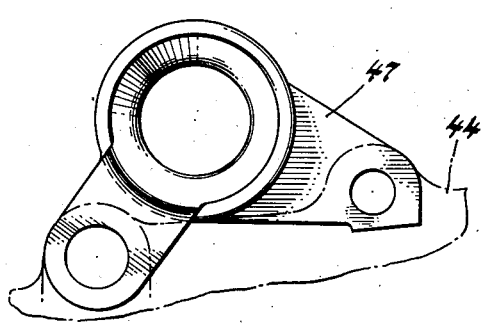

For a better understanding of the structure, reference may be had to the accompanying drawings wherein Figure 1 is a top plan view of the rear portion of a motor vehicle with parts broken away, to show the arrangement and disposition of the vehicle drive mechanism; Figure 2 shows the power plant and its mounting in end elevation; Figures 3, 4, 5, and 7 are detail sectional views taken, respectively, on lines 3—3, 4—4, 5—5, and 7—7 of Figure 1; Figure 6 shows the connection of Figure 5 in elevation; Figure 8 is an elevation of the outer member of the Figure 7 connection; Figure 9 is a detail view illustrating the mounting of the rear end of the vehicle on the drive unit, and Figure 10 an enlarged view showing the engine mounting as in Figure 2.

Only so much of the vehicle structure is shown in the drawings as is deemed necessary to illustrate the essentially important features of the invention. The front end of the vehicle may be of any conventional type, but preferably the front wheels are independently sprung and the body may be so constructed as to eliminate the need for the usual separate chassis frame. A construction of this kind is shown in my copending application Serial No. 41,062.

In the drawings the rear of the body 1 contains a compartment for the power unit which may be accessible through an opening, closed by a door 2, for inspection and minor repairs and adjustments. The engine compartment is separated from the space to be occupied by the passengers by a transverse wall, which may include a sheet metal panel 4, extending across and between the sides 5. Each side wall, in transverse alinement with each other, carries an outwardly projecting fender or splash guard 6 and a depressed wheel housing 7 to house a drive wheel 8. The drive wheels are independently sprung from a dead axle 9 extending transversely within the engine compartment and constituting a main framing element. The spring suspension devices are mounted at opposite ends of the dead axle 9 and are of a well known type, as, for example, that used on current models of Chevrolet automobiles. Briefly, the device includes a housing 10 enclosing a coil spring against which acts a lever on a rockshaft, forming a unit with the wheel spindle lever 11. The swinging lever arm 11, as will be readily understood, carries a spindle on which the wheel 8 is rotatably mounted and the load is transmitted to the wheels through the resilient spring acting on the wheel spindle arm 11.

To reduce strain and afford a smooth ride of the vehicle, the body load is imposed on the dead axle 9 as near to the wheels as possible, and for this purpose the dead axle is detachably connected near opposite ends and adjacent the wheel mountings, to transversely spaced body framing elements. As shown in Figure 1 these framing members at each side consist of a longitudinal member 12 and a diagonal member 13 converging rearwardly and joining with a semi-circular socket 14 to fit the tube 9. Figure 9 shows one of the U-bolts 15 by which a removable cap piece 16 is secured to the seat 14.

At an intermediate point in its length, the dead axle 9 carries the weight of the power plant. This power plant is shown in the drawings as including in a unitary assembly an engine, a clutch, transmission and differential with the axis of the differential below and in parallel spaced relation with the axis of the transversely extending power shaft of the engine and which last mentioned axis is common to the input and output shafts of the variable speed mechanism and the clutch. The engine is shown as having a series of radially disposed cylinders 17 and in transverse succession is shown the gear box 18 and the clutch housing 19. Thus the variable speed gearing is located between the engine and the clutch, but the drive is from the engine through the clutch to the transmission, with the input and output shafts for the clutch nested one within the other according to a well known expedient. The drive from the variable speed mechanism goes directly to the differential gearing contained within the housing 20 and located on the vehicle center line. Extending outwardly from opposite sides of the differential are universally joined drive shafts or axles 21 connected to the independently sprung wheels 8—8. In order to keep down angularity in the drive shafts 21, the engine is supported to bring the axis of the differential mechanism approximately in alinement with the wheel axes in average operation. Accordingly the engine is offset rearwardly from the supporting tube 9 and the power unit is formed with a forwardly extending boss or bracket 22 having a semi-circular recess which cooperates with a clamping cap 23 bolted thereto in embracing relation with the dead axle. For insulation purposes a ring 24 of rubber or the like is inserted between the tube 9 and the part seated thereon.

The bracing struts are indicated at 25, 26, 27, and 28 and these are arranged in pairs to extend divergently from opposite ends near the top of the engine to the compartment side walls. The connection to the side walls in the case of the struts 25 and 26 is by means of a series of bolts 29, which pass through a foot 30 of each strut and also serve to hold in assembled relation to the side wall 5, the wheel fender 6 and the housing 7. In the case of the anchored ends of the struts 27 and 28 it is proposed to employ the connection shown in detail in Figure 3. As seen in this figure the wall or partition 4 is provided with a reinforcing rib 31 which cooperates with a pressed out portion 32 of a metal strip 33, preferably welded to the wall 4 along opposite edges to afford a strengthening tube construction. At opposite sides the formations 31 and 32 are formed of flattened faces containing alined apertures through which a pair of flanged sleeves 34 are projected. The sleeves 34 provide bearings for a pair of flanged collars 35 of rubber or other suitable insulating material and through which a headed fastening bolt 36 extends for passage through the apertured head 37 of the bracing strut.

Insulating joints detachably connected with the engine are provided to join the adjacent ends of the struts 25 and 27 and also the adjacent ends of the struts 26 and 28. The last mentioned struts, as seen in Figure 5, may be welded at their inner ends to a sleeve or outer member 38 enclosing a ring 39 of rubber, fitted to a tapered stud 40 on the U-shaped bracket member 41. For convenience of assembly a washer 42 adjustably mounted by the bolt 43, cooperates with the stud 40 in holding the rubber sleeve in place, and preferably under an initial compressive strain. The U-shaped bracket 41 is fitted to a transverse ridge 44 formed as a part of the power plant housing and attachment studs 45 serve to hold the parts for ready detachment.

Similar attachment studs 46 secure to the ridge 44 at the other end of the engine, the mounting bracket 47 through which connection is made with the struts 25 and 27, and in this case the bracket 47 has an opening therethrough which flares outwardly from the middle to provide openings that taper inwardly from both sides. Within the openings are a pair of cooperating oppositely disposed conical plugs 48 of rubber and these are fitted to a spacer sleeve 49 between coupling heads 50 on each strut. A fastening bolt 51 extends through the coupling heads 50 and spacer sleeve 49 to hold the parts in assembled relation and each coupling head is provided near its inner end with an annular flange 52 seating against the outer face of the adjacent plug 48 for squeezing the rubber axially to the predetermined degree for which the parts are designed, to insure a firm, yet resilient connection.

From the above description it will be apparent that in the assembled relation of parts, engine vibrations are effectively insulated and prevented from transmission through the vehicle body to the car occupants. Predetermined settings for the rubber joints are provided for and when these parts are once assembled they need not be disturbed when the power unit is to be removed from the vehicle. Instead, it is only necessary to remove the fastening bolts 45 and 46 as well as the U-bolts 15 in order to drop the whole driving unit from the vehicle body 1 and its framing members. When this operation is performed it will be understood, of course, that the vehicle body is hoisted or otherwise supported prior to the detachment of the parts, and also that disconnection must be made of such parts as the operating members for the wheel brakes, clutch, transmission, carburetor or other controls. Thus the whole of the vehicle propelling mechanism may be quickly removed and replaced as an assembled unit.

I claim:

1. In a motor vehicle, the combination with a power plant embodying as a unitary assembly, an engine, change speed gearing and a clutch arranged in axial alinement and a differential below the axially alined parts with an axis in spaced parallelism to the axis of said parts and a body having a compartment to house said power plant, of a mounting for said power plant including a supporting member rigid with the body within said compartment, a bearing associated with the differential and secured to said supporting member to transmit thereto the entire gravity load of the power plant, vibration insulating means associated with said bearing, a pair of brace rods connected with the body at their outer ends and extending convergently inwardly from the body and connected at their inner ends with the top of the power plant near opposite ends thereof, and vibration insulating means associated with the several rods.

2. In a motor vehicle, a power plant, a body having a compartment to house the power plant, a framing element rigid with the body, a single weight supporting connection within the compartment between the framing element and the power plant intermediate the ends of and below the power plant to carry the gravity load thereof, and a pair of wishbone braces connecting the top of the power plant with the body and extending divergently outward from each end of the power plant.

3. In a motor vehicle, a dead axle, swinging wheel lever arms at opposite ends of the axle, road wheels mounted on the free ends of said lever arms, a transversely positioned power plant offset to one side of the dead axle with its output shaft in substantial alinement with the wheel centers, a cushion support mounting the power plant on the dead axle, swinging axle shafts connecting the power plant output shaft with said wheels, a body detachably supported on said dead axle and provided with a compartment overhanging the axle to house the power plant, and cushion braces between the body and the top of the engine for cooperation with said cushion support mounting.

4. In a motor vehicle, propelling mechanism including a pair of road wheels and an engine between and in transverse alinement with the wheels, an axle offset to one side of the engine, wheel suspension arms swingably mounted on the ends of the axle, a laterally projecting engine bearer fixed to the axle at a central point and a body detachably mounted on the axle adjacent the suspension arms.

5. In a motor vehicle, the combination with a body having an engine compartment at the rear, of a detachable drive unit including a transverse mounting member to be received within the engine compartment, an engine resiliently mounted on the member in rearwardly offset relation thereto and having a pair of outwardly extending drive shafts, a pair of rearwardly extending swinging lever arms resiliently mounted on the opposite ends of said member, road wheels on the free ends of the lever arms for connection in substantially transverse alinement with said drive shafts, and means detachably mounting the body on said member.

ERIC OLLE SCHJOLIN.